US012579524B2

(12) United States Patent
Hamilton et al.

(10) Patent No.: US 12,579,524 B2
(45) Date of Patent: Mar. 17, 2026

(54) CRYPTOCURRENCY TERMINAL AND TRANSACTION PROCESSING

(71) Applicant: Cardtronics USA, Inc., Atlanta, GA (US)

(72) Inventors: Andrew Robert Hamilton, Dundee (GB); Gordon A. Forsyth, Kinross (GB); Stephen Glencross, Dunfermline (GB)

(73) Assignee: Cardtronics USA, Inc., Atlanta, GA (US)

( * ) Notice: Subject to any disclaimer, the term of this patent is extended or adjusted under 35 U.S.C. 154(b) by 87 days.

(21) Appl. No.: 15/884,485

(22) Filed: Jan. 31, 2018

(65) Prior Publication Data

US 2019/0236561 A1 Aug. 1, 2019

(51) Int. Cl.

| | |
|---|---|
| *G06Q 20/06* | (2012.01) |
| *G06K 1/12* | (2006.01) |
| *G06K 7/14* | (2006.01) |
| *G06Q 20/10* | (2012.01) |
| *G06Q 20/18* | (2012.01) |
| *G06Q 20/20* | (2012.01) |

(52) U.S. Cl.
CPC ........... *G06Q 20/065* (2013.01); *G06K 1/121* (2013.01); *G06K 7/1417* (2013.01); *G06Q 20/1085* (2013.01); *G06Q 20/18* (2013.01); *G06Q 20/202* (2013.01); *G06Q 20/204* (2013.01)

(58) Field of Classification Search
CPC .. G06Q 20/065; G06Q 20/1085; G06Q 20/18; G06Q 20/202; G06Q 20/204; G06Q 20/20; G06Q 20/36; G06Q 40/04; G06K 1/121; G06K 7/1417
See application file for complete search history.

(56) References Cited

U.S. PATENT DOCUMENTS

| | | | | |
|---|---|---|---|---|
| 10,055,715 B1* | 8/2018 | Grassadonia | ........ | G06Q 20/065 |
| 2015/0170112 A1* | 6/2015 | DeCastro | ............ | G06Q 20/381 |
| | | | | 705/39 |
| 2015/0356524 A1* | 12/2015 | Pennanen | ............ | G06Q 20/065 |
| | | | | 705/71 |
| 2016/0012465 A1* | 1/2016 | Sharp | ..................... | G06Q 20/18 |
| | | | | 705/14.17 |
| 2016/0086418 A1* | 3/2016 | Smolen | ................... | G07F 9/001 |
| | | | | 700/232 |
| 2016/0342976 A1* | 11/2016 | Davis | ................. | G06Q 20/3829 |
| 2018/0025442 A1* | 1/2018 | Isaacson | ............ | H04L 63/0861 |
| | | | | 705/26.62 |
| 2018/0204195 A1* | 7/2018 | Kang | ................... | G06Q 20/027 |
| 2019/0081789 A1* | 3/2019 | Madisetti | ............. | H04L 9/0637 |
| 2019/0318326 A1* | 10/2019 | Russell | ............. | G06Q 20/3276 |

OTHER PUBLICATIONS

Buy Your Coffee with Bitcoin: Real-World Deployment of a Bitcoin Point of Sale Terminal (Shayan Eskandari et al., 2016, IEEE, 382-389).*

* cited by examiner

*Primary Examiner* — Ariel J Yu

(74) *Attorney, Agent, or Firm* — Schwegman Lundberg & Woessner, P.A.

(57) ABSTRACT

A Point-Of-Sale (POS) terminal is provided. The POS terminal is configured to process government-backed currency transactions. Furthermore, the POS terminal is configured to process cryptocurrency purchase and sell transactions.

16 Claims, 4 Drawing Sheets

100

DIGITAL CURRENCY
EXCHANGE
110

POS TERMINAL
120

TRANSACTION MANAGER
121

EXCHANGE API
125

DIGITAL CURRENCY
TRANSACTION MANAGER
122

TOUCH SCREEN
126

CURRENCY ACCEPTOR AND
DISPENSER
123

CARD READER
127

SCANNER
124

PRINTER
128

EXCHANGE DIGITAL WALLET
ACCOUNT ADDRESS
130

CUSTOMER DIGITAL WALLET
ACCOUNT ADDRESS
140

POS TERMINAL
400

PROCESSOR
401

TRANSACTION MANAGER
402

CRYPTOCURRENCY
TRANSACTION MANAGER
403

FIG. 4

CRYPTOCURRENCY TERMINAL AND TRANSACTION PROCESSING

BACKGROUND

Significant segments of the population worldwide has adopted usage of cryptocurrencies. Traditional forms of payment such as credit card, debit card, cash and check are still widely recognized as the preferred methods of payment for transactions. Even with consumer adoption of crypto-currencies, retailers are reluctant to accept or even provide cryptocurrency as an option or a service to consumers. This reluctance is largely based on the price variations in the value of cryptocurrency, which can substantially fluctuate from hour to hour or even minute to minute.

To a large extent, cryptocurrency valuation risks are bore by consumers. The exchanges permit digital wallet to wallet transfers, purchases of digital currencies with government-backed currency, and conversion from a digital currency back to a government-backed currency. Consumers bear the price valuation risks encountered with transactions per-formed by the exchanges. Moreover, depending upon the digital currency and amounts involved, the transactions can take mere seconds or several hours to complete.

Some retailers have installed cryptocurrency Self-Service Terminals (SST) as a service to consumers, which allows a consumer to buy and sell cryptocurrency during self-service transactions at the specialized terminals. However, these terminals occupy valuable retail space, have to be serviced and maintained, and are expensive to purchase.

Furthermore, very few retailers are currently willing to accept cryptocurrency as a form of payment because of the price valuation swings that are notorious in the crypto markets.

SUMMARY

In various embodiments, methods and a terminal for cryptocurrency processing are presented.

According to an embodiment, a method for cryptocur-rency transaction processing is presented. More particularly, an interface is provided on a POS terminal for processing a cryptocurrency transaction and a government-backed cur-rency transaction. The POS terminal interacts with a cryp-tocurrency exchange during the cryptocurrency transaction.

BRIEF DESCRIPTION OF THE DRAWINGS

FIG. 4 is a diagram of a Point-Of-Sale (POS) terminal for cryptocurrency transaction processing, according to an example embodiment.

DETAILED DESCRIPTION

Figure 1:
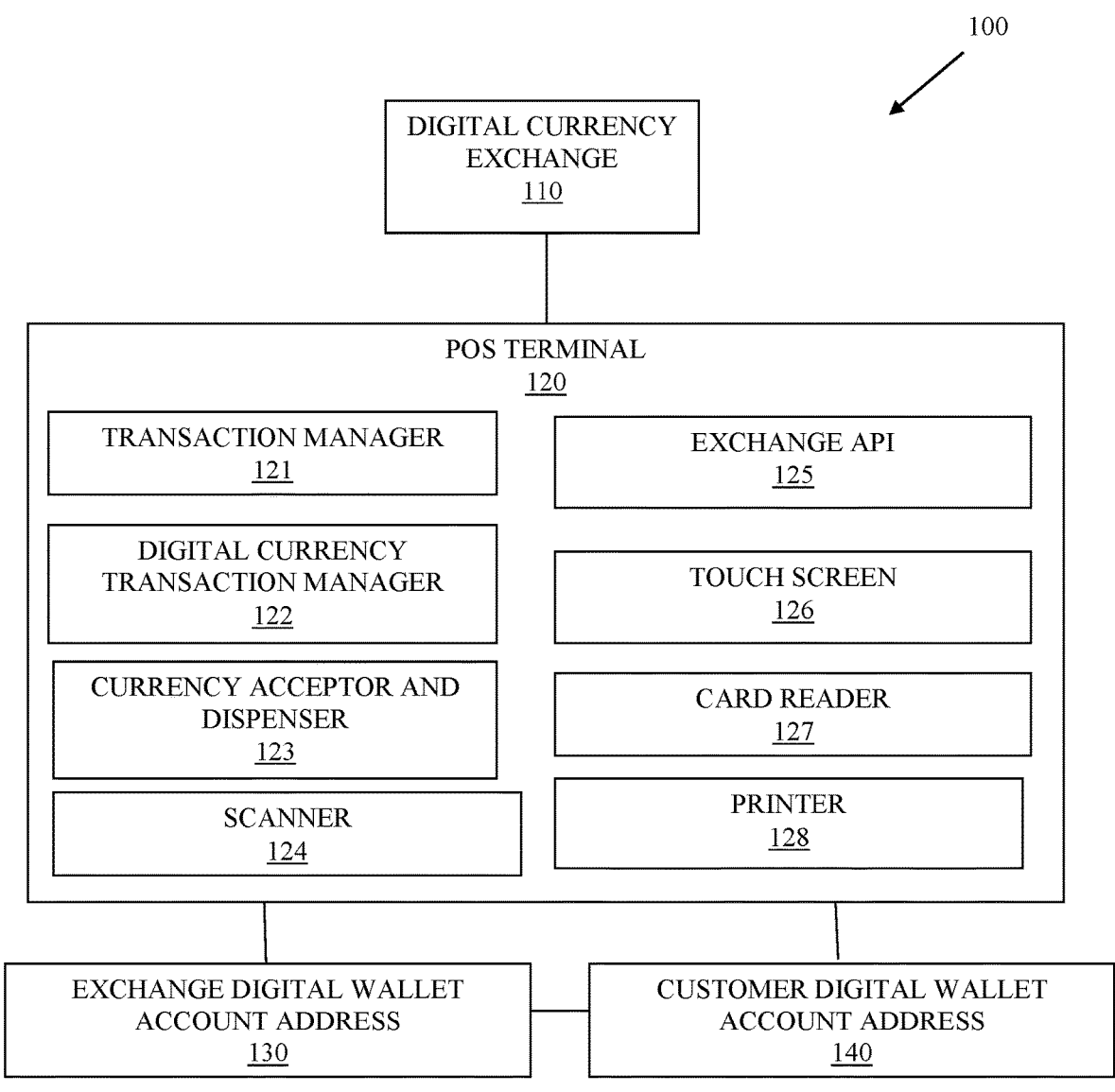
FIG. 1 is a diagram of a system for cryptocurrency transaction processing, according to an example embodi-ment.

FIG. 1 is a diagram of a system for cryptocurrency transaction processing, according to an example embodi-ment. The various components are illustrated and the arrangement of the components is presented for purposes of illustration only. It is to be noted that other arrangements with more or less components are possible without departing from the cryptocurrency transaction processing presented herein and below.

The techniques, methods, and system presented herein and below for cryptocurrency transaction processing can be implemented in whole or in part in one, all, or some combination of the components shown with the system 100. The techniques and methods are programmed as executable instructions in memory and/or non-transitory computer-readable storage media and processed on one or more processors associated with the various components.

As used herein the terms "customer," "consumer," and "user" may be used synonymously and interchangeably.

As used herein the phrases "exchange," "cryptocurrency exchange," and "digital currency exchange" may be used synonymously and interchangeable. These phrases refer to an external third-party cryptocurrency service provider that provides cryptocurrency exchange services through one or more web-based servers. These services can include: 1) digital wallet to wallet transfers, 2) purchasing of crypto-currency using a different cryptocurrency from the crypto-currency being purchased or using a government-backed currency, and 3) selling of cryptocurrency into a different cryptocurrency from what was being sold or into a govern-ment-backed currency.

The system 100 includes: a digital currency exchange 110, a POS terminal 120, an exchange digital wallet 130, and a customer digital wallet 140. The POS terminal 120 includes a transaction manager 121, a digital currency transaction manager 122, a currency acceptor and dispenser 123, a scanner 124, an exchange Application Programming Interface (API) 125, a touch screen 126, a card reader 127, and a printer 128.

The POS terminal 120 is an existing POS terminal 120 that performs payment transactions utilizing conventionally-accepted forms of payment (cash, card-based, and/or check-based). However, the POS terminal 120 is enhanced with the digital currency transaction manager 122 for performing cryptocurrency-based transactions. That is, rather than deploying a specialized cryptocurrency terminal as dedi-cated hardware, the digital currency transaction manager 122 permits an existing POS terminal 120 to be enhanced for cryptocurrency-based transactions.

The POS terminal 120 includes network circuitry for interacting with the interfaces of one or more digital cur-rency exchanges 110 over network connections. The API 125 permits the digital currency transaction manager 122 to establish network connections and communicate directly with a digital currency exchange 110 during cryptocurrency transactions.

The API 125 also allows the digital currency transaction manager 122 to expose interfaces of the exchange 110 from the POS terminal 120. Specifically, available types of trans-actions and transaction interfaces for each type of transac-tion at the exchange 110 is exposed through the API 125 to the digital currency transaction manager 122.

An initial operator-facing interface of the POS terminal 120 is modified to provide a selection option that permits the operator to activate the transaction manager 121 for con-ventional payment transactions on the POS terminal 120 or to activate the digital currency transaction manager 122 for cryptocurrency transactions.

When the option is selected to perform a cryptocurrency transactions is selected from the operator-facing interface, the digital currency transaction manager 122 exposes the transaction types through an interface on the POS terminal 120. The interfaces allows the operator to select cryptocurrency transaction types for processing at the POS terminal 120. The selectable transaction types include: 1) purchasing a cryptocurrency (with another different type of cryptocurrency from the cryptocurrency that is being purchased or with a designated government-backed currency) and 2) selling a cryptocurrency (with the funds from the sell being in another different type of cryptocurrency from the cryptocurrency that was sold or with the funds from the sell being in a designated government-backed currency).

When a cryptocurrency purchase transaction type is selected from the interface of the POS terminal 120, the digital currency transaction manager 122 interacts with the exchange 110 to display through the interface current prices for available cryptocurrencies that can be purchased by the operator. The prices are reflected in a designated government-backed currency (such as U.S. dollars, U.K. pounds, Euros, etc.).

The operator then inputs into the interface the desired amount of a particular cryptocurrency that the operator desires to purchase and a final amount due for the transaction in the designated government-backed currency is presented in the interface to the user.

Next, the digital currency transaction manager 122, through the interface, asks the operator to select a type of funds that will be used for the purchase of a designated cryptocurrency. When the type of funds selected is the designated government-backed currency, the operator through the interface is instructed to either insert the government-backed currency into the currency acceptor and dispenser 123 or insert a payment card (bank card, debit card, or credit card) into the card reader 127 of the POS terminal 120.

The digital currency transaction manager 122 interacts with the currency acceptor and dispenser 123 to ensure the proper amount of funds needed for the purchase transaction are received in the designated government-backed currency. Alternatively, the digital currency transaction manager 122 interacts with the card reader 127 to receive the payment account details for the cryptocurrency purchase transaction.

Next, the digital currency transaction manager 122, through the interface, asks the customer to scan the customer's digital wallet account address 140 by presenting the Quick Response (QR) code that identifies the wallet account address 140 to the scanner 124.

Once the digital currency transaction manager 122 has the funds in the designated government-backed currency and has scanned the customer's account address 140, the digital currency transaction manager 122 submits the transaction for processing to the exchange 110 through the API 125. The digital currency transaction manager 122 then causes the printer 128 to print a receipt for the transaction, which includes: the type of cryptocurrency purchased by the customer, the amount of funds received for the purchase in the designated government-backed currency, the time and date, a unique account number for the transaction (which can itself also be printed on the receipt as a QR code or barcode), etc.

When the customer selects a source for the funds as another cryptocurrency owned by the customer through the interface, the digital currency transaction manager 122, through the interface, displays the amount of the cryptocurrency that is being sold needed to purchase the desired cryptocurrency at the current rates for each currency to achieve the amount needed in the designated government-backed currency. The digital currency transaction manager 122, through the interface, asks the customer to provide the account address for the cryptocurrency being sold (this can be done through a scan of the account address or through entry on the touch screen 126 or through an encrypted PIN pad (not shown in the FIG. 1). Next, the digital currency transaction manager 122, asks the customer to scan the wallet account address 140 through the scanner 124 where the purchased cryptocurrency is to be deposited. The digital currency transaction manager 122 them submits the transaction for processing through the API 125 to the exchange 110 and prints a receipt through the printer 128 in the manner discussed above.

It is to be noted that a wallet can include account addresses for a plurality of different cryptocurrencies held by the consumer, such that when the consumer is buying a target cryptocurrency by selling a source cryptocurrency, the consumer supplies the wallet 140 and the two addresses for the two different cryptocurrency accounts can be obtained from the single wallet 140. It is noted, however, that in some cases a consumer can have a plurality of wallets 140, each wallet representing a different cryptocurrency account or the consumer may have multiple different accounts and wallets 140 for a same type of cryptocurrency, such that the consumer holds a same type of cryptocurrency with multiple different exchanges 110. Therefore, the customer digital wallet 140 can include a plurality of wallets held by the customer, in some embodiments.

When the customer selects a cryptocurrency transaction type to sell a cryptocurrency for an amount of government-backed funds, the digital currency transaction manager 122, through the interface, instructs the customer to scan the exchange wallet account address 130 presented on the touch screen with the customer's mobile device (having a cryptocurrency mobile app). It is noted that the account 130 is created as a subaccount by the digital currency transaction manager 122 for the transaction and associated with the exchange and/or retailer. The interface may also instruct the customer as to the cryptocurrency amount to enter into the mobile app needed for the customer to receive the amount of the government-backed funds based on the current exchange rates supplied by the exchange 110 at the time of the transaction to the digital currency transaction manager 122 through the API 125.

The time it takes for confirmation that the sell successfully completed can be a seconds, minutes, or even an hour or more as the sell transaction is processed through the exchange 110. When it appears that the transaction can be completed in seconds or minutes (such as when Ethereum is being sold), the customer can remain at the POS terminal 120 and when the digital currency transaction manager 122, through the API 125, receives confirmation that the amount of Ethereum was received in the wallet account 130 from the exchange 110, the digital currency transaction manager 122 causes the currency acceptor and dispenser 123 to dispense the government-backed funds in the amount for the transaction from the POS terminal 120. It is noted that when the POS terminal 120 is operated by an attendant (not a SST), the attendant is notified by an alert from the digital currency transaction manager 122 that the cash drawer can be opened and the funds dispensed to the customer. When the amount of time to confirm the sell is expected to take more than a few minutes (such as when Bitcoin is being sold), the digital currency transaction manager 122 prints a receipt with a QR or barcode for the customer. The QR code identifying a unique transaction account that the customer (through the customer's cryptocurrency mobile application (mobile app)) is to send the cryptocurrency that is being sold. The customer may then return to an attendant of the POS terminal 120 (or any POS terminal 120 within the retail establishment) present the receipt for scanning the QR code and receives the funds after the digital currency transaction manager 122 verifies that the cryptocurrency was received in the unique transaction account set up by the digital currency transaction manager 122 for the sell transaction and represented in the scanned QR code.

The process of selling a source cryptocurrency to collect funds in a second different cryptocurrency at the POS terminal 120 is similar to that which was presented above when the customer was buying a target currency using funds from a source currency (two account addresses 140 (which can be a single and same wallet 140 as discussed above) for the customer are collected and obtained through the interface by the digital currency transaction manager 122). The digital currency transaction manager 122, then prints a receipt utilizing the printer 128 for the customer's records. No further action is needed by the POS terminal 120 because in this sell scenario the customer was just selling one cryptocurrency in one wallet account address 140 to get more of a second cryptocurrency in a same or second wallet account address 140 of the customer. The receipt provides confirmation of the transaction processed by the digital currency transaction manager 122 at the POS terminal.

A variety of processing flows can occur with the above-presented embodiments.

For example, the retailer of the POS terminal 120 may have its own wallet account address 130 to perform the above-noted transactions or may utilize the wallet account address 130 of the exchange 110.

In another case, when the POS terminal 120 is an Automated Teller Machine (ATM), the customer may buy a designated amount of a particular cryptocurrency using the customer's bank account with a financial institution. In this scenario, the digital currency transaction manager 122 transfers funds for the purchase from the customer's bank account to the exchange 110 either through a cryptocurrency account maintained by the bank with the exchange 110 or through an electronic funds transfer (ETF) from the account to a bank account of the exchange 110. Here, the customer can operate the ATM for conventional banking transactions and can access through the interface and the digital currency transaction manager 122 (processing on the ATM) a transfer of funds to the exchange 110 to have a designated cryptocurrency deposited in the customer's wallet account 140.

The reverse transaction, of the above-noted embodiment, is also available where the customer sells an amount of cryptocurrency and the resulting funds in a government-backed currency are deposited into the customer's bank account or immediately withdrawn by the custom at the ATM. Again, if a withdrawal is desired by the customer and the sell is expected to take longer than a few minutes (Bitcoin being sold), a QR or barcoded receipt can be printed and subsequently scanned at the ATM or a different ATM once the transaction completes for the funds to be dispensed.

In an embodiment, the POS terminal 120 is operated by an attendant. During a sell operation, the QR code printed as a receipt and provided to the customer represents a unique transaction account for the sell transaction that was created by the digital currency transaction manager 122. This permits the digital currency transaction manager 122 to receive a notice from the exchange 110 through the API 125 when the funds are available and the sell transaction has successfully completed. The QR code when subsequently provided by the customer to the attendant at the POS terminal 120 is scanned and the sell transaction and unique transaction account address identified from the decoded QR code by the digital currency transaction manager 122. Next, the attendant can open a cash drawer to receive the funds to provide to the customer or the digital currency transaction manager 122 can activate the cash drawer to open for the attendant to obtain the funds that are needed to complete the sell transactions.

In an embodiment, the POS terminal 120 is a SST. In an embodiment, the SST is an ATM. In an embodiment, the POS terminal 120 is a kiosk.

In an embodiment, the digital currency transaction manager 122 interacts with a plurality of different exchanges 110. That is, once a customer selects from the interface a cryptocurrency transaction, the customer may be presented with a selection of exchanges 110 to assist in processing the cryptocurrency transaction.

In an embodiment, the cryptocurrencies can include Bitcoin, Ethereum, Lite Coin, IOTA, Zero Coin, etc.

In an embodiment, the cryptocurrencies include any Blockchain-based token exchanged for value.

The digital currency transaction manager 122 provides processing to integrate cryptocurrency transactions into enhanced existing POS terminals creating POS terminal 120. Conventional retail-based transaction can also be performed on the POS terminal 120 with the cryptocurrency transactions. This reduces expenses and retail space associated with deploying specialized cryptocurrency terminals in retail establishments and allows existing POS terminals to be enhanced with the digital currency transaction manager 122 to provide cryptocurrency transactions to customers.

These embodiments and other embodiments are now discussed with reference to the FIGS. 2-4.

Figure 2:
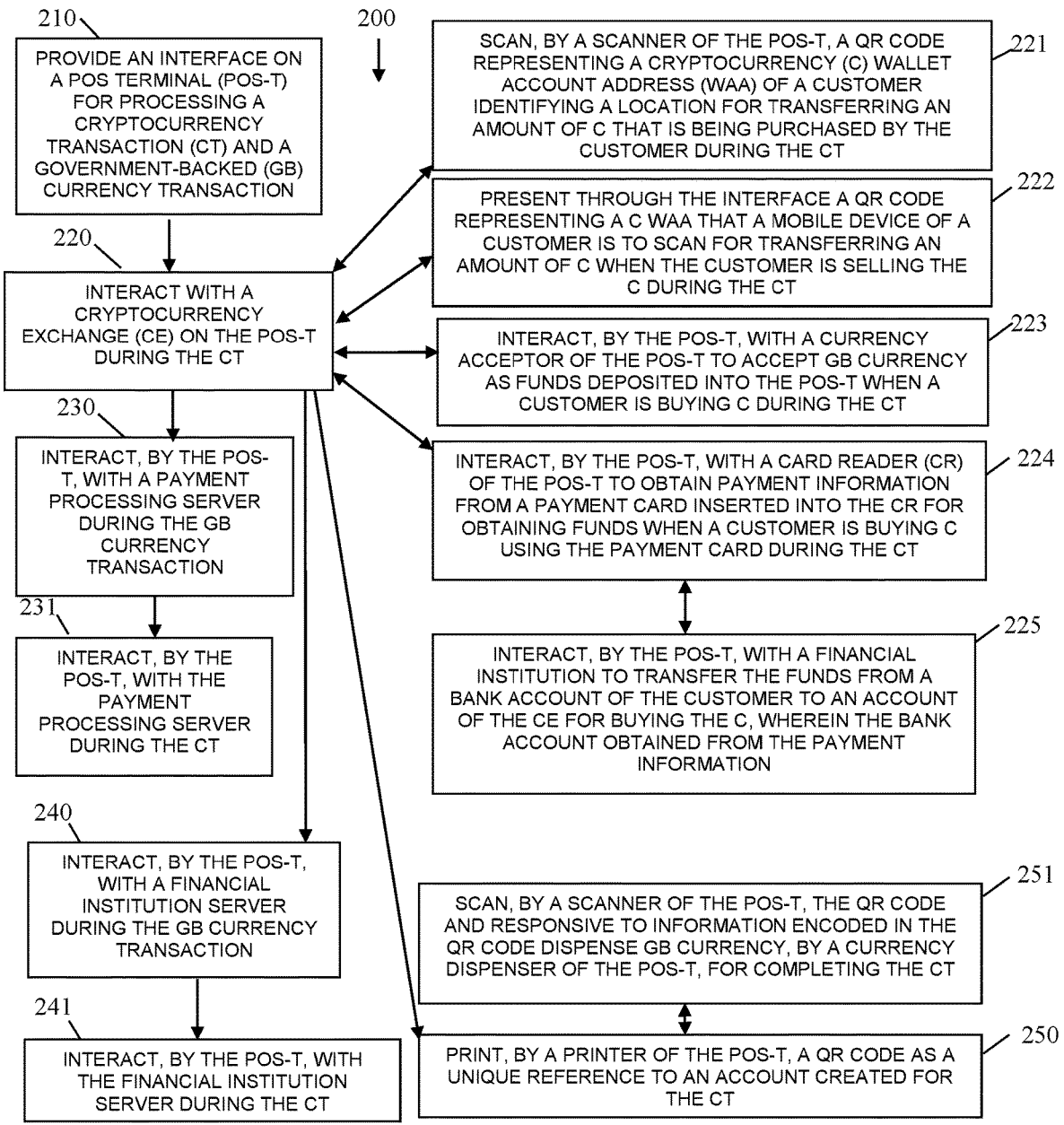
FIG. 2 is a diagram of a method for cryptocurrency transaction processing, according to an example embodi-ment.

FIG. 2 is a diagram of a method 200 for cryptocurrency transaction processing, according to an example embodiment. The software module(s) that implements the method 200 is referred to as a "cryptocurrency transaction manager." The cryptocurrency transaction manager is implemented as executable instructions programmed and residing within memory and/or a non-transitory computer-readable (processor-readable) storage medium and executed by one or more processors of a device. The processor(s) of the device that executes the cryptocurrency transaction manager are specifically configured and programmed to process the cryptocurrency transaction manager. The cryptocurrency transaction manager has access to one or more networks during its processing. The networks can be wired, wireless, or a combination of wired and wireless.

In an embodiment, the cryptocurrency transaction manager is the digital currency transaction manager 122.

In an embodiment, the device that executes the cryptocurrency transaction manager is the POS terminal 120. In an embodiment, the POS terminal 120 is operated by an attendant on behalf of a customer for a cryptocurrency transaction. In an embodiment, the POS terminal 120 is a SST. In an embodiment, the SST is an ATM. In an embodiment, the POS terminal is a kiosk.

At 210, the cryptocurrency transaction manager provides an interface on a POS terminal for processing both cryptocurrency transaction and a government-backed currency transaction.

At 220, the cryptocurrency transaction manager interacts with cryptocurrency exchange on the POS terminal during the cryptocurrency transaction.

According to an embodiment, at 221, the cryptocurrency transaction manager scans, by a scanner of the POS terminal, a QR code representing a cryptocurrency account address of a customer that identifies a location for transferring an amount of cryptocurrency that is being purchased by the customer during the cryptocurrency transaction.

In an embodiment, at 222, the cryptocurrency transaction manager presents, through the interface, a QR code representing a cryptocurrency account address that a mobile device of a customer is to scan for transferring an amount of cryptocurrency when the customer is selling the cryptocurrency during the cryptocurrency transaction.

In an embodiment, at 223, the cryptocurrency transaction manager interacts, by the POS terminal, with a currency acceptor of the POS terminal to accept government-backed currency being deposited into the POS terminal when a customer is buying during the cryptocurrency transaction.

In an embodiment, at 224, the cryptocurrency transaction manager interacts, by the POS terminal, with a card reader of the POS terminal to obtain payment information from a payment card inserted into the card reader for obtaining funds when a customer is buying cryptocurrency using the payment card during the cryptocurrency transaction.

In an embodiment of 224 and at 225, the cryptocurrency transaction manager interacts, by the POS terminal, with a financial institution to transfer the funds from a bank account of the customer to an account of the cryptocurrency for buying the cryptocurrency. The bank account is obtained from the payment information.

In an embodiment, at 230, the cryptocurrency transaction manager interacts, by the POS terminal, with a payment processing server during the government-backed currency transaction.

In an embodiment of 230 and at 231, the cryptocurrency transaction manager interacts, by the POS terminal, with the payment processing server during the cryptocurrency transaction.

In an embodiment, at 240, the cryptocurrency transaction manager interacts, by the POS terminal, with a financial institution server during the government-backed currency transaction.

In an embodiment of 240 and at 241, the cryptocurrency transaction manager interacts, by the POS terminal, with the financial institution server during the cryptocurrency transaction.

In an embodiment, at 250, the cryptocurrency transaction manager prints, by a printer of the POS terminal a QR code as a unique reference to an account created for the cryptocurrency transaction. It is noted that the unique reference represents a unique transaction account for processing the cryptocurrency transaction, which the cryptocurrency transaction manager can subsequently check to verify the transaction completed.

In an embodiment of 250 and at 251, the cryptocurrency transaction manager scans, by a scanner of the POS terminal, the QR code and responsive to information encoded in the QR code dispenses government-backed currency, by the currency dispenser of the POS terminal, for completing the cryptocurrency transaction.

Figure 3:
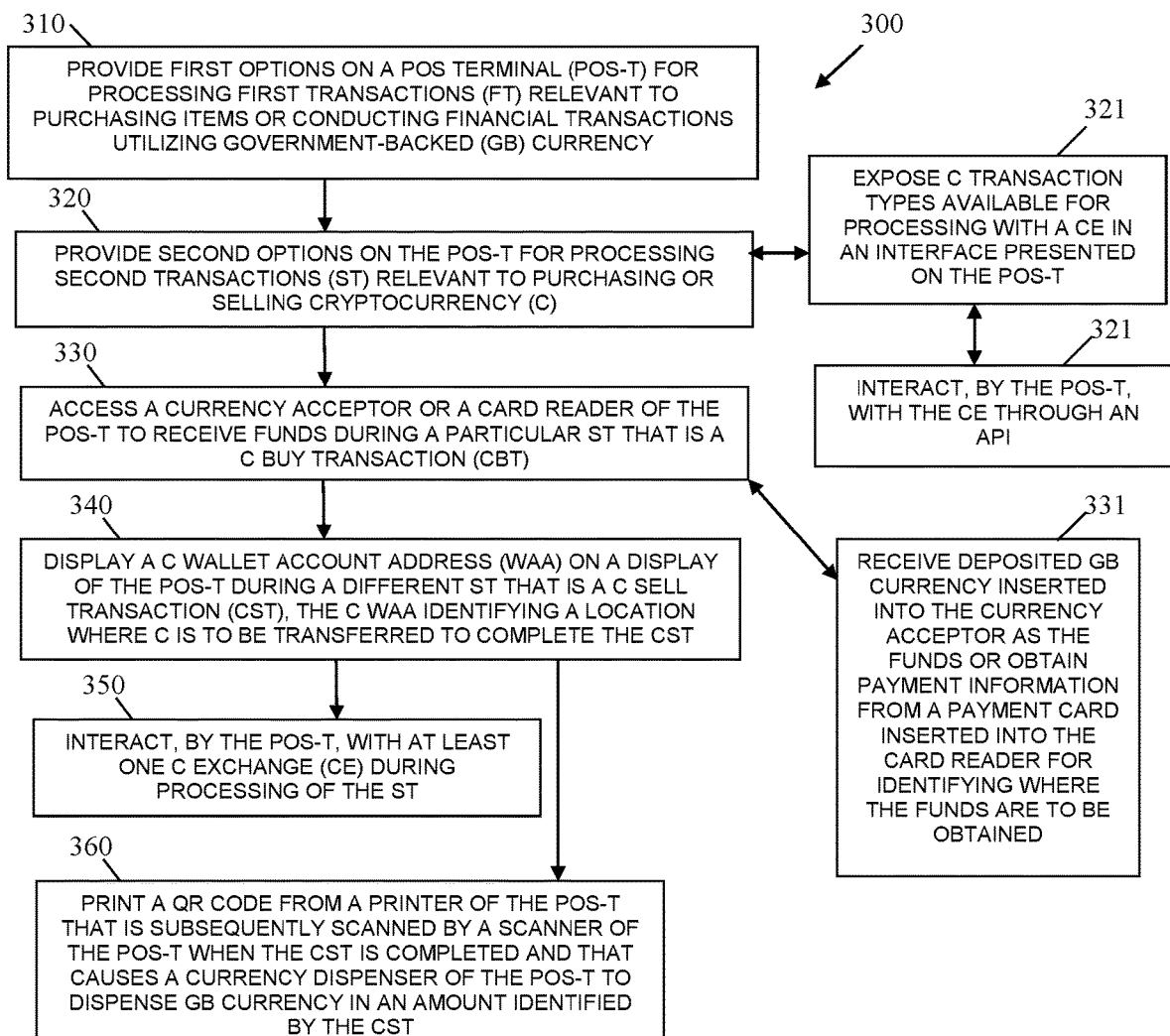
FIG. 3 is a diagram of another method for cryptocurrency transaction processing, according to an example embodi-ment.

FIG. 3 is a diagram of another method 300 for cryptocurrency transaction processing, according to an example embodiment. The software module(s) that implement the method 300 is referred to herein as a "POS cryptocurrency manager." The POS cryptocurrency manager is implemented as executable instructions and programmed within memory and/or a non-transitory computer-readable (processor-readable) storage medium that executes on one or more processors of a device. The processors of the device are specifically configured to execute the POS cryptocurrency manager. The POS cryptocurrency manager has access one or more networks; the networks can be wired, wireless, or a combination of wired and wireless.

In an embodiment, the POS cryptocurrency manager is all or digital currency transaction manager 122.

In an embodiment, the POS cryptocurrency manager is the method 200.

In an embodiment, the device that executes the POS cryptocurrency manager is the POS terminal 120. In an embodiment, the POS terminal 120 is operated by an attendant on behalf of a customer for a cryptocurrency transaction. In an embodiment, the POS terminal 120 is a SST. In an embodiment, the SST is an ATM. In an embodiment, the POS terminal is a kiosk.

The POS cryptocurrency manager presents another and in some ways enhanced processing perspective of the cryptocurrency transaction manager discussed in the FIG. 2.

At 310, the POS cryptocurrency manager provides first options on a POS terminal for processing first transaction relevant to purchasing items or conducting financial transactions utilizing government-backed currency.

At 320, the POS cryptocurrency manager provide second options on the POS terminals for processing second transactions relevant to purchasing or selling cryptocurrency.

In an embodiment, at 321, the POS cryptocurrency manager exposes cryptocurrency transaction types available for processing with a cryptocurrency in an interface presented on the POS terminal.

In an embodiment of 321 and at 322, the POS cryptocurrency manager interacts, by the POS terminal with a cryptocurrency exchange through an API.

At 330, the POS cryptocurrency manager accesses a currency acceptor or a card reader of the POS terminal to receive funds during a particular second transaction that is a cryptocurrency buy transaction.

In an embodiment, at 331, the POS cryptocurrency manager receives deposited government-backed currency inserted into the currency acceptor as the funds or obtains payment information from a payment card inserted into the card reader for identifying where the funds are to be obtained.

At 340, the POS cryptocurrency manager displays a cryptocurrency account address on a display of the POS terminal during a different second transaction that is a cryptocurrency sell transaction. The cryptocurrency account address identifying a location where cryptocurrency is to be transferred to complete the cryptocurrency sell transaction.

According to an embodiment, at 350, the POS cryptocurrency manager interacts, by the POS terminal with at least one cryptocurrency exchange during processing of the second transactions.

In an embodiment, at 360, the POS cryptocurrency manager prints a QR code from a printer of the POS terminal that is subsequently scanned by a scanner of the POS terminal when the cryptocurrency sell transaction is completed and that causes a currency dispenser of the POS terminal to dispense government-backed currency in an amount identified by the cryptocurrency sell transaction.

Figure 4:
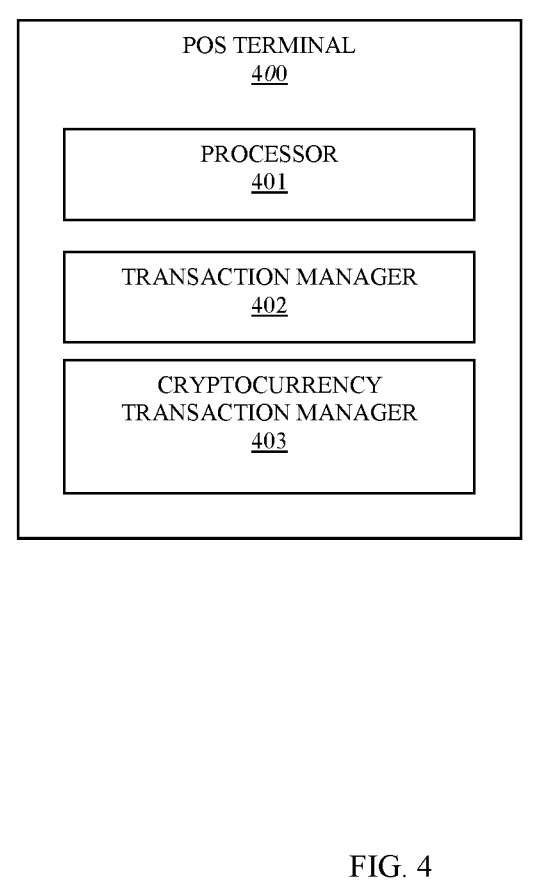

FIG. 4 is a diagram of a POS terminal 400 for cryptocurrency transaction processing, according to an example embodiment. The components of the POS terminal 400 are programmed and reside within memory and/or a non-transitory computer-readable medium and execute on one or more processors of the devices of the POS terminal 400. The POS terminal 400 also has access and can communicate over one or more networks; and the networks can be wired, wireless, or a combination of wired and wireless.

The POS terminal 400 is configured and programmed to perform the processing discussed above with the FIGS. 1-3.

The POS terminal 400 includes: at least one hardware processor 401, a transaction manager 402, and a cryptocurrency transaction manager 403.

In an embodiment, the POS terminal 400 is a cashier-assisted terminal operated on behalf of a customer conducting a cryptocurrency transaction at the POS terminal 400.

In an embodiment, the POS terminal 400 is a SST. In an embodiment, the SST is an ATM. In an embodiment, the SST is a kiosk.

In an embodiment, the POS terminal 400 is the POS terminal 120.

In an embodiment, the transaction manager 402 is the transaction manager 121.

In an embodiment, the cryptocurrency transaction manager 403 is all of or some combination of: the digital currency transaction manager 122, the method 200, and/or the method 300.

The transaction manager 402 is configured to execute on the processor 401 as executable instructions that perform government-backed currency transactions for purposes of purchasing goods or services or conducting financial transactions.

The cryptocurrency transaction manager 403 is configured to: 1) execute on the processor 401, 2) perform a cryptocurrency buy transaction, 3) perform a cryptocurrency sell transaction, and 4) interact with a cryptocurrency exchange to perform the cryptocurrency buy transaction and the cryptocurrency sell transaction.

The cryptocurrency transaction manager 403 directs and interacts with peripheral modules of the POS terminal 400 during the cryptocurrency buy transaction and the cryptocurrency sell transaction. The peripherals at least include one or more of: a currency acceptor and dispenser, a payment card reader, a touch screen, an encrypted PIN pad, a keyboard, a scanner, and a printer.

It should be appreciated that where software is described in a particular form (such as a component or module) this is merely to aid understanding and is not intended to limit how software that implements those functions may be architected or structured. For example, modules may be illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors of a single device, or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:

providing a hardware processor of a Point-Of-Sale (POS) terminal, executable instructions from a non-transitory computer-readable storage medium of the POS terminal cause the hardware processor to execute the executable instructions and perform processing on the POS terminal comprising:

exposing available types of transactions and transaction interfaces for each type of transaction at a cryptocurrency exchange through an application programming interface (API) to a cryptocurrency transaction manager;

providing an interface that is processed on the POS terminal for processing a cryptocurrency transaction and a government-backed currency transaction by using the API and exposing, by the API, a cryptocurrency exchange interface from within an existing operator-facing interface of the POS terminal for the government-backed currency transaction of a retailer, wherein providing further includes modifying the existing operator-facing interface of the POS terminal as the interface, the interface processes the API and exposes the cryptocurrency exchange interface from within a modified interface representing the interface with the API and the existing operator-facing interface, wherein the modified interface comprising two selectable options when a payment for the cryptocurrency transaction is due, a first selectable option activates a transaction manager for conventional processing of the payment and a second selectable option activates the cryptocurrency exchange interface, wherein the second selectable option is activated causing activation of the cryptocurrency transaction manager associated with the cryptocurrency exchange interface;

interacting with a cryptocurrency exchange from the POS terminal using the cryptocurrency exchange interface integrated within the modified interface on the POS terminal during the cryptocurrency transaction using the API, wherein interacting further includes verifying completion of the cryptocurrency transaction on a blockchain and tracing the transaction directly to a customer performing the cryptocurrency transaction, wherein interacting further includes interacting with an additional cryptocurrency exchange for the cryptocurrency transaction when the customer is using multiple different cryptocurrency accounts and wallets for the cryptocurrency transaction;

creating a unique transaction account for the cryptocurrency transaction as a POS account associated with POS terminal of the retailer for the cryptocurrency transaction and the unique transaction account is created with the cryptocurrency exchange for verification by the cryptocurrency transaction manager and tracing to the POS terminal, wherein the unique transaction account is a unique wallet address for a POS wallet with the cryptocurrency exchange permitting notice to be received by the POS terminal from the cryptocurrency exchange when the cryptocurrency transaction completes on a blockchain and permitting tracing of the cryptocurrency transaction over the blockchain linking directly to the customer performing the cryptocurrency transaction on the POS terminal; and causing a printer of the POS terminal to print a receipt for the cryptocurrency transaction, the receipt comprising a type of cryptocurrency purchased, if any, during the cryptocurrency transaction, an amount of funds received for any purchase in a designated government-backed currency, and a unique account number for the unique transaction account;

when an amount of time to confirm a sell is expected to take more than a few minutes, causing the printer to print a Quick Response (QR) code as a unique reference to the unique transaction account created for the cryptocurrency transaction the customer is required to subsequently return back to the POS terminal to scan the QR code via a scanner of the POS terminal and responsive to information encoded in the QR code dispensing government-backed currency, by a currency dispenser of the POS terminal, for completing the cryptocurrency transaction;

wherein the executable instructions are processed enabling an existing POS terminal to be enhanced and to process cryptocurrency-based transactions rather than deploying a specialized cryptocurrency terminal as dedicated hardware;

wherein the cryptocurrency transaction manager directs and interacts with peripheral modules of the POS terminal during a cryptocurrency buy transaction and a cryptocurrency sell transaction, the peripheral modules at least include one or more of:

a currency acceptor and the currency dispenser, a card reader, a touch screen, an encrypted PIN pad, a keyboard, the scanner, and the printer.

2. The method of claim 1 further comprising, interacting with a payment processing server during the government-backed currency transaction.

3. The method of claim 2 further comprising, interacting with the payment processing server during the cryptocurrency transaction.

4. The method of claim 1 further comprising, interacting with a financial institution server during the government-backed currency transaction.

5. The method of claim 4 further comprising, interacting with the financial institution server during the cryptocurrency transaction.

6. The method of claim 1, wherein interacting further includes scanning, by a scanner of the POS terminal, a Quick Response (QR) code representing a cryptocurrency account address of the customer identifying a location for transferring an amount of cryptocurrency that is being purchased by the customer during the cryptocurrency transaction.

7. The method of claim 1, wherein interacting further includes presenting through the interface a Quick Response (QR) code representing a cryptocurrency account address that a mobile device of the customer is to scan for transferring an amount of cryptocurrency when the customer is selling the cryptocurrency during the cryptocurrency transaction.

8. The method of claim 1, wherein interacting further includes interacting, by the POS terminal, with a currency acceptor of the POS terminal to accept government-backed currency as funds deposited into the POS terminal when the customer is buying cryptocurrency during the cryptocurrency transaction.

9. The method of claim 1, wherein interacting further includes interacting, by the POS terminal, with the card reader of the POS terminal to obtain payment information from a payment card inserted into the card reader for obtaining funds when the customer is buying cryptocurrency using the payment card during the cryptocurrency transaction.

10. The method of claim 9, wherein interacting further includes interacting, by the POS terminal, with a financial institution to transfer the funds from a bank account of the customer to an account of the cryptocurrency exchange for buying the cryptocurrency, wherein the bank account obtained from the payment information.

11. A method, comprising:

providing a hardware processor of a Point-Of-Sale (POS) terminal, executable instructions from a non-transitory computer-readable storage medium of the POS terminal cause the hardware processor to execute the executable instructions and perform processing on the POS terminal comprising:

exposing available types of transactions and transaction interfaces for each type of transaction at a cryptocurrency exchange through an application programming interface (API) to a cryptocurrency transaction manager;

providing first options on the POS terminal for processing first transactions relevant to purchasing items or conducting financial transactions utilizing government-backed currency using a modified interface representing an existing operator-facing interface of the POS terminal that is modified within the API that interacts with a cryptocurrency exchange interface for second options provided within the modified interface, wherein the modified interface comprising two selectable options when a payment for a cryptocurrency transaction is due to a retailer, a first selectable option activates a transaction manager for conventional processing of the payment and a second selectable option activates the cryptocurrency exchange interface, wherein when the second selectable option is activated, the cryptocurrency transaction manager associated with the cryptocurrency exchange interface is also activated;

providing the second options on the POS terminal within the modified interface when the second selectable option is activated for processing second transactions relevant to purchasing or selling cryptocurrency using the API interfaced to the existing operator-facing interface of the POS terminal and the cryptocurrency exchange interface through the cryptocurrency transaction manager, wherein processing the second transactions further include creating a unique transaction account for the cryptocurrency transaction as a POS account associated with the POS terminal of the retailer;

accessing a currency acceptor or a card reader of the POS terminal to receive funds during a particular second transaction that is a cryptocurrency buy transaction;

displaying a cryptocurrency account address on a display of the POS terminal during a different second transaction that is a cryptocurrency sell transaction, the cryptocurrency account address identifying a location where cryptocurrency is to be transferred to complete the cryptocurrency sell transaction;

creating the unique transaction account for the cryptocurrency transaction as the POS account for the POS terminal of the retailer for the cryptocurrency transaction and the unique transaction account is created with the cryptocurrency exchange for verification by the cryptocurrency transaction manager on the POS terminal and tracing to the POS terminal, wherein the unique transaction account is a unique wallet address for a POS wallet with the cryptocurrency exchange permitting notice to be received at the POS terminal from the cryptocurrency exchange when the cryptocurrency transaction completes on a blockchain and permitting tracing of the cryptocurrency transaction over the blockchain linking directly to a customer performing the cryptocurrency transaction on the POS terminal, wherein creating further includes interacting with cryptocurrency exchange and an additional cryptocurrency exchange for the cryptocurrency transaction when the customer is using multiple different cryptocurrency accounts and wallets for the cryptocurrency transaction;

causing a printer of the POS terminal to print a receipt for the cryptocurrency transaction, the receipt comprising a type of cryptocurrency purchased, if any, during the cryptocurrency transaction, an amount of funds received for any purchase in a designated government-backed currency, and a unique account number for the unique transaction account;

when an amount of time to confirm a sell is expected to take more than a few minutes, causing the printer to print a Quick Response (QR) code as a unique reference to the unique transaction account created for the cryptocurrency transaction the customer is required to subsequently return back to the POS terminal to scan the QR code via a scanner of the POS terminal and responsive to information encoded in the QR code dispensing government-backed currency, by a currency dispenser of the POS terminal, for completing the cryptocurrency transaction;

wherein the executable instructions are processed enabling an existing POS terminal to be enhanced and to process cryptocurrency-based transactions rather than deploying a specialized cryptocurrency terminal as dedicated hardware;

wherein the cryptocurrency transaction manager provides processing to integrate cryptocurrency transactions into enhanced existing POS terminals creating the POS terminal, wherein conventional retail-based transactions can also be performed on the POS terminal with the cryptocurrency transactions, reducing expenses and retail space associated with deploying specialized cryptocurrency terminals in retail establishments.

12. The method of claim 11 further comprising by the executable instructions, with at least one cryptocurrency exchange during processing of the second transactions using the API that interacts with the cryptocurrency exchange interface.

13. The method of claim 11, wherein providing the second options further include exposing cryptocurrency transaction types available for processing with a cryptocurrency exchange in the modified interface presented on the POS terminal.

14. The method of claim 13, wherein exposing further includes interacting, by the POS terminal, with the cryptocurrency exchange through the API.

15. The method of claim 11, wherein accessing further includes receiving deposited government-backed currency inserted into the currency acceptor as the funds or obtaining payment information from a payment card inserted into the card reader for identifying where the funds are to be obtained.

14

16. A Point-Of-Sale (POS) terminal, comprising:
a processor;
a non-transitory computer-readable storage medium comprising executable instructions representing a transaction manager and a cryptocurrency transaction manager; and
the transaction manager executed by the processor from the non-transitory computer-readable storage medium causing the processor to perform processing on the POS terminal comprising:
exposing available types of transactions and transaction interfaces for each type of transaction at a cryptocurrency exchange through an application programming interface (API) to the cryptocurrency transaction manager;
performing government-backed currency transactions using a modified interface comprising an existing operator-facing interface of the POS terminal and the API that interacts from within the modified interface with a cryptocurrency exchange interface, wherein the modified interface comprising two selectable options when a payment for a given transaction is due, a first selectable option activates the transaction manager for conventional processing of the payment and a second selectable option activates the cryptocurrency exchange interface, wherein the second selectable option is activated causing activation of the cryptocurrency transaction manager associated with the cryptocurrency exchange interface; and
the cryptocurrency transaction manager executed by the processor from the non-transitory computer-readable storage medium causing the processor to perform processing comprising:
performing, on and from the POS terminal, a cryptocurrency buy transaction associated with a retailer using the API that interacts with the existing operator-facing interface and the cryptocurrency exchange interface of a cryptocurrency exchange;
performing, on and from the POS terminal, a cryptocurrency sell transaction using the API that interacts with the existing operator-facing interface and the cryptocurrency exchange interface of the cryptocurrency exchange and interact with the cryptocurrency exchange to perform the cryptocurrency buy transaction and the cryptocurrency sell transaction, wherein an interaction includes creating a unique transaction account for a cryptocurrency transaction as a POS account associated with the POS terminal of the retailer;
creating the unique transaction account for the cryptocurrency transaction as the POS account for the POS terminal of the retailer for the cryptocurrency transaction and the unique transaction account is created with the cryptocurrency exchange for verification by the cryptocurrency transaction manager and tracing to the POS terminal, wherein the unique transaction account is a unique wallet address for a POS wallet with the cryptocurrency exchange permitting notice to be received by the POS terminal from the cryptocurrency exchange when the cryptocurrency transaction completes on a blockchain and permitting tracing of the cryptocurrency transaction over the blockchain linking directly to a customer performing the cryptocurrency transaction on the POS terminal, wherein creating further includes interacting with cryptocurrency exchange and an additional cryptocurrency exchange for the cryptocurrency transaction when the customer is using multiple different cryptocurrency accounts and wallets for the cryptocurrency transaction; and causing a printer of the POS terminal to print a receipt for the cryptocurrency transaction, the receipt comprising a type of cryptocurrency purchased, if any, during the cryptocurrency transaction, an amount of funds received for any purchase in a designated government-backed currency, and a unique account number for the unique transaction account;

when an amount of time to confirm a sell is expected to take more than a few minutes, causing the printer to print a Quick Response (QR) code as a unique reference to the unique transaction account created for the cryptocurrency transaction the customer is required to subsequently return back to the POS terminal to scan the QR code via a scanner of the POS terminal and responsive to information encoded in the QR code dispensing government-backed currency, by a currency dispenser of the POS terminal, for completing the cryptocurrency transaction;

wherein the transaction manager is processed enabling an existing POS terminal to be enhanced and to process cryptocurrency-based transactions rather than deploying a specialized cryptocurrency terminal as dedicated hardware;

wherein the POS terminal includes network circuitry for interacting with interfaces of one or more cryptocurrency exchanges over network connections, and wherein the API permits the cryptocurrency transaction manager to establish network connections and communicate directly with the cryptocurrency exchange during cryptocurrency transactions.

* * * * *